United States Patent
Lim et al.

(10) Patent No.: US 9,628,874 B2
(45) Date of Patent: Apr. 18, 2017

(54) IMAGING APPARATUS AND METHOD OF PROVIDING VIDEO SUMMARY

(71) Applicant: HANWHA TECHWIN CO.,LTD., Changwon-si (KR)

(72) Inventors: Jeongeun Lim, Changwon-si (KR); Daehwan Kim, Changwon-si (KR); Jisung Kim, Changwon-si (KR); Eunji Choi, Changwon-si (KR); Seungin Noh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 185 days.

(21) Appl. No.: 14/680,222

(22) Filed: Apr. 7, 2015

(65) Prior Publication Data
US 2016/0007100 A1 Jan. 7, 2016

(30) Foreign Application Priority Data
Jul. 7, 2014 (KR) ........................ 10-2014-0084623

(51) Int. Cl.
| | |
|---|---|
| *H04N 5/77* | (2006.01) |
| *H04N 9/80* | (2006.01) |
| *H04N 21/8549* | (2011.01) |
| *G11B 27/10* | (2006.01) |
| *H04N 21/433* | (2011.01) |
| *H04N 5/91* | (2006.01) |
| *H04N 9/82* | (2006.01) |
| *H04N 21/84* | (2011.01) |

(52) U.S. Cl.
CPC ......... *H04N 21/8549* (2013.01); *G11B 27/10* (2013.01); *H04N 5/91* (2013.01); *H04N 9/8205* (2013.01); *H04N 21/4334* (2013.01); *H04N 21/84* (2013.01)

(58) Field of Classification Search
USPC ................................ 386/223–225, 241, 248
See application file for complete search history.

(56) References Cited

U.S. PATENT DOCUMENTS

| | | | |
|---|---|---|---|
| 8,102,406 B2 | 1/2012 | Peleg et al. | |
| 8,311,277 B2 | 11/2012 | Peleg et al. | |
| 2004/0239763 A1* | 12/2004 | Notea | H04N 5/222 |
| | | | 348/169 |
| 2008/0068496 A1 | 3/2008 | Jeong et al. | |
| 2008/0097970 A1* | 4/2008 | Olstad | G06F 17/30796 |

(Continued)

FOREIGN PATENT DOCUMENTS

| | | |
|---|---|---|
| KR | 10-2008-0026275 A | 3/2008 |
| KR | 10-2011-0105437 A | 9/2011 |

*Primary Examiner* — Nigar Chowdhury
(74) *Attorney, Agent, or Firm* — Sughrue Mion, PLLC

(57) ABSTRACT

Provided is an imaging apparatus for providing a video summary, the apparatus including: a storage configured to store at least one original video; a metadata generator configured to generate metadata with regard to the original video; a video summary generator configured to generate at least one video summary script with regard to the original video by using the generated metadata and generate a video summary based on the generated video summary script; and an image reproducer configured to control the storage, the metadata generator, and the video summary generator, store the metadata generated by the metadata generator, and reproduce at least one of the original video and the video summary.

18 Claims, 8 Drawing Sheets

(56) References Cited

U.S. PATENT DOCUMENTS

| | | | | |
|---|---|---|---|---|
| 2008/0112684 A1* | 5/2008 | Matsushita | ....... | G06F 17/30802 386/278 |
| 2008/0152297 A1* | 6/2008 | Ubillos | ................ | G11B 27/034 386/333 |
| 2008/0155421 A1* | 6/2008 | Ubillos | ................ | G11B 27/031 715/724 |
| 2011/0032430 A1* | 2/2011 | Prieto | ................... | G09G 3/3406 348/687 |
| 2011/0292244 A1* | 12/2011 | Deever | .................... | H04N 9/87 348/231.2 |
| 2014/0153900 A1* | 6/2014 | Tanaka | ................. | G11B 27/034 386/239 |
| 2014/0341527 A1* | 11/2014 | Hurley | ................... | H04N 19/40 386/224 |
| 2015/0042835 A1* | 2/2015 | Chiu | ................. | H04N 5/23293 348/222.1 |

\* cited by examiner

IMAGING APPARATUS AND METHOD OF PROVIDING VIDEO SUMMARY

CROSS-REFERENCE TO THE RELATED APPLICATION

This application claims priority from Korean Patent Application No. 10-2014-0084623, filed on Jul. 7, 2014, in the Korean Intellectual Property Office, the disclosure of which is incorporated herein in its entirety by reference.

BACKGROUND

1. Field

Apparatuses and methods consistent with exemplary embodiments relate to a video reproduction apparatus, and more particularly, to an imaging apparatus for providing a video summary.

2. Description of the Related Art

A network image surveillance system is used to monitor streets, buildings, factories, etc. which a user wants to keep under observation for certain purposes such as crime prevention via image capturing devices such as network cameras.

The network image surveillance system may be a network video recorder (NVR) system. The NVR system is an image security system capable of transmitting, storing, and monitoring images of a surveillance target area by using Internet protocols for image surveillance.

The NVR system is configured to flexibly perform image security surveillance via Internet networks and is advantageous in terms of expandability, reduced setting costs, flexible remote monitoring, etc. Korean Patent 10-2006-0028307 discloses a system for providing a real time personal video summary, a video summary information creation apparatus/method, and a video summary information provision apparatus and method.

SUMMARY

When a user performs a search or reproduction operation based on image data having a long runtime, the user has to spend a long time proportional to the runtime. Although a storage device may have a fast forward or fast backward function that the user may employ in order to reduce the search or reproduction time, it is still difficult to search for or reproduce specific information in large videos.

According to an exemplary embodiment of the inventive concept, when the user wants to search for significant data in a video having a long runtime, an image searched for by the user is extracted by using only a video summary function.

Various aspects of exemplary embodiments will be set forth in part in the description which follows and, in part, will be apparent from the description, or may be learned by practice of the presented embodiments.

According to an aspect of an exemplary embodiment, there is provided an imaging apparatus for providing a video summary which may include: a storage configured to store at least one original video; a metadata generator configured to generate metadata with regard to the original video; a video summary generator configured to generate at least one video summary script with regard to the original video by using the generated metadata and generate a video summary based on the generated video summary script; and an image reproducer configured to control the storage, the metadata generator, and the video summary generator, store the metadata generated by the metadata generator, and reproduce at least one of the original video and the video summary. The metadata generator may be further configured to assigns at least one identifier to at least one object, respectively, appearing the original video, and provide the video summary by extracting at least one of coordinate information of the object to which the identifier is assigned, object classification information for classifying the object according to type thereof, color classification information for classifying the object according to color thereof, and movement detection information of the object.

The video summary script may be used to extract at least one video section corresponding to the video summary from among the original video. The at least one video section may include a video indicating a predetermined movement in the original video.

The video summary script may contain time information with regard to each of the at least one video section, the at least one video section may be classified based on the time information, and the at least one classified video section may be decoded by using at least one decoder.

The video summary unit may generate the video summary by combining the at least one video section decoded by the at least one decoder.

The image reproduction unit may reproduce both the original video and the video summary.

The image reproduction unit may reproduce the original video together with a plurality of video summaries with regard to the original video.

The image reproduction unit may reproduce a plurality of original videos and video summaries with regard to the original videos together.

According to an aspect of another exemplary embodiment, there is provided a method of providing a video summary by using an imaging apparatus which may include: storing at least one original video in the storage; generating, in the metadata generator, metadata with regard to the original video; generating, in the video summary generator, at least one video summary script with regard to the original video by using the generated metadata, and generating a video summary based on the generated video summary script; and reproducing at least one of the original video and the video summary in the image reproducer.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
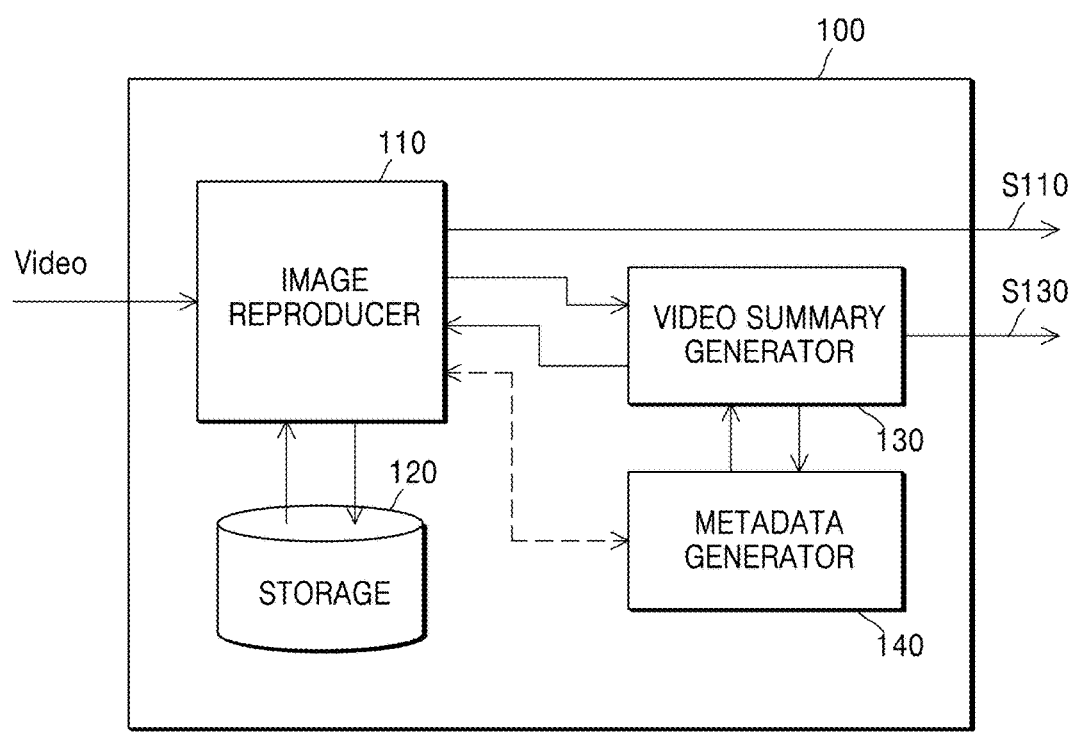
FIG. 1 shows an imaging apparatus for providing a video summary, according to an exemplary embodiment.

As the inventive concept allows for various changes and numerous embodiments, exemplary embodiments will be illustrated in the drawings and described in detail in the written description. The attached drawings for illustrating the exemplary embodiments are referred to in order to gain a sufficient understanding of the inventive concept, the merits thereof, and the objectives accomplished by the implementation of the exemplary embodiments. This inventive concept may, however, be embodied in many different forms and should not be construed as limited to the exemplary embodiments set forth herein.

Hereinafter, the inventive concept will be described in detail by explaining the exemplary embodiments with reference to the attached drawings. Like reference numerals in the drawings denote like elements, and repeated descriptions thereof will be omitted.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including", "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Sizes of components in the drawings may be exaggerated for convenience of explanation. In other words, since sizes and thicknesses of components in the drawings are arbitrarily illustrated for convenience of explanation, the following embodiments are not limited thereto.

FIG. 1 shows an imaging apparatus 100 for providing video summaries, according to an exemplary embodiment.

The imaging apparatus 100 may be a network video recorder (NVR), a digital video recorder (DVR), or the like. According to an exemplary embodiment, the imaging apparatus 100 further includes an image reproducer 110, a storage 120, a video summary generator 130, and a metadata generator 140.

According to an exemplary embodiment, the imaging apparatus 100 stores input images including video files received from a network camera or an external image device in a wired or wireless manner, reproduces the stored input images, and provides video summaries of the reproduced input images when the input images are reproduced according to a user request.

According to an exemplary embodiment, the imaging apparatus 100 may receive images from network cameras and may display the received images on a single display screen.

Figure 6:
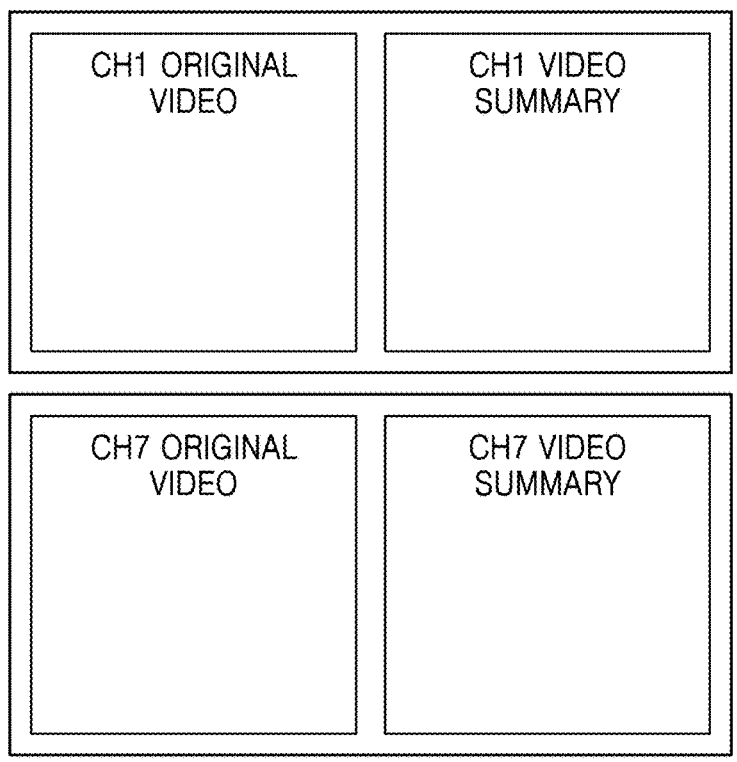
FIG. 6 shows reproduction of video summaries in an imaging apparatus, according to an exemplary embodiment.

According to another exemplary embodiment with reference to FIG. 6, when input images are displayed on a single display screen, the imaging apparatus 100 may display both the input images and video summaries thereof on the display screen.

Figure 7:
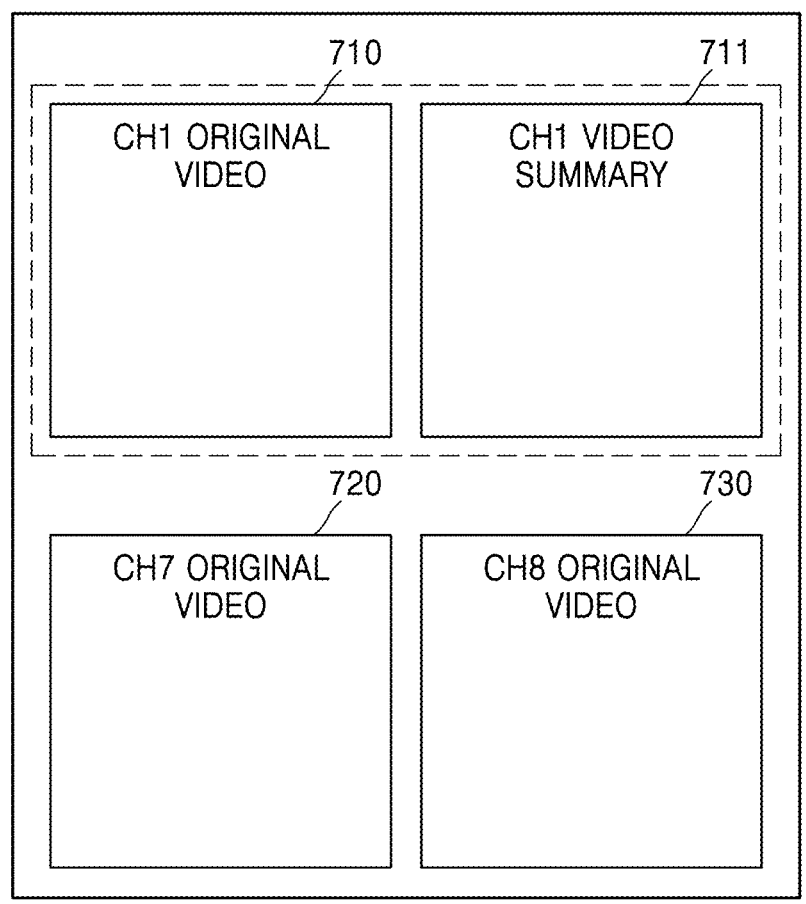
FIG. 7 shows an example in which video summary functions for respective channels are selectively turned on/off when the channels are displayed in an imaging apparatus, according to an exemplary embodiment.

According to another exemplary embodiment with reference to FIG. 7, when input videos from multiple channels are displayed on a single display screen, a video summary from each channel may be selectively displayed on the display screen together with an original video of the video summary based on a user selection.

Figure 8:
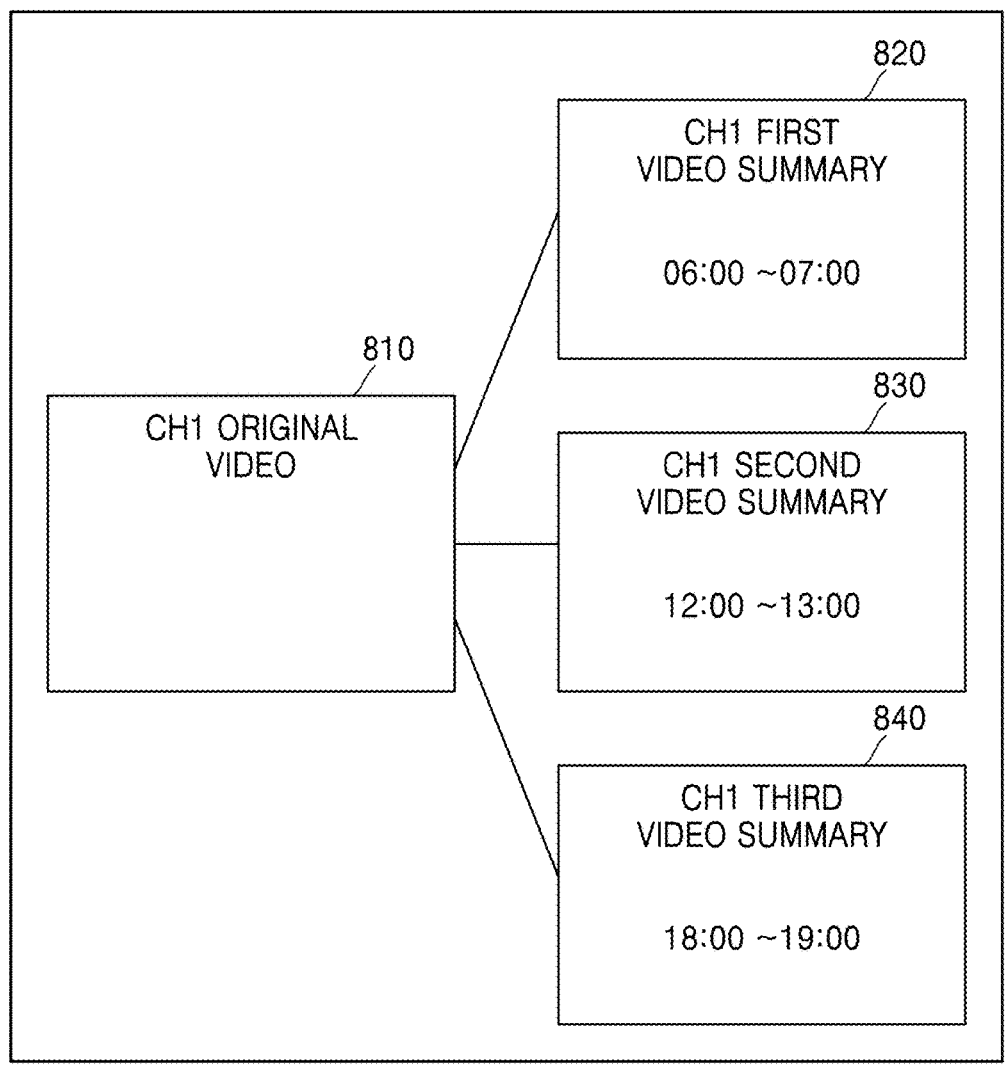
FIG. 8 shows an example of simultaneously reproducing a desired number of video summaries with regard to a single channel in an imaging apparatus, according to an exemplary embodiment.

According to another exemplary embodiment with reference to FIG. 8, the imaging apparatus 100 may display a single original video and several video summaries or synopsis video clips of different time sections on a single display screen.

Figure 9:
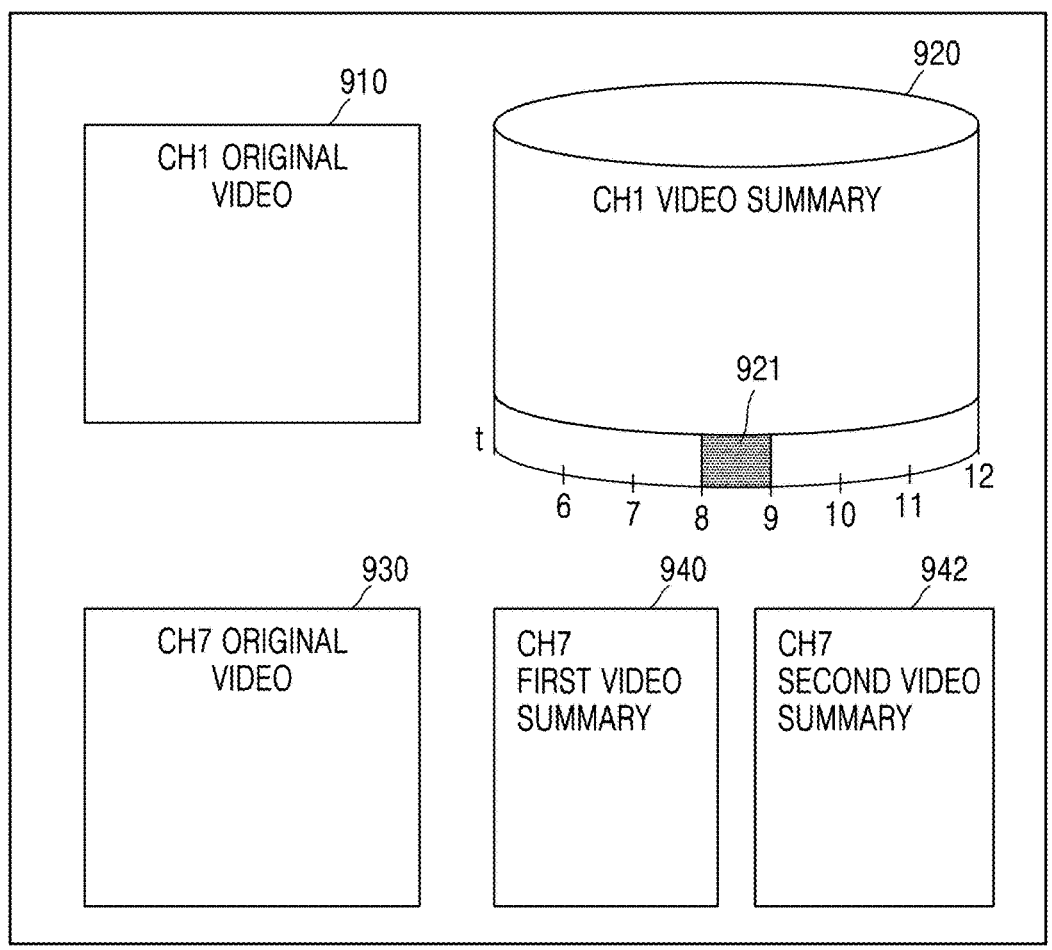
FIG. 9 shows an example of reproducing a desired number of video summaries with regard to multiple channels of an imaging apparatus, according to an exemplary embodiment.

According to another exemplary embodiment with reference to FIG. 9, the imaging apparatus 100 may display a first video together with one video summary and a second video together with multiple video summaries.

Each component of the imaging apparatus 100 for providing video summaries is briefly described as follows with reference to FIG. 1. According to an exemplary embodiment, the image reproducer 110 may be a central processing unit (CPU), and the storage 120 may be a hard disk drive (HDD).

The image reproducer 110 receives an original video that is input, and stores the received original video in the storage 120. Also, while storing the original video in the storage 120, the image reproducer 110 may reproduce the received original video on the display screen of the imaging apparatus 100. The image reproducer 110 controls the storage 120, the video summary generator 130, and the metadata generator 140 and reproduces the original video and/or at least one video summary.

The image reproducer 110 may also provide the metadata generator 140 with the original video that is input. The metadata generator 140 extracts metadata from the original video in order to perform an intelligent image analysis and stores the extracted metadata in the storage 120.

The metadata generator 140 assigns identification numbers to objects in the original video in time section units of the original video, and extracts at least one of coordinate information of the objects to which the identification numbers are assigned, object classification information for classifying the objects according to types thereof, color classification information for classifying the objects according to colors thereof, and movement detection information of the objects.

The objects may be a person, an animal, a product, etc., and each object has its feature information. As an example of the feature information, when the object is a vehicle, information about whether the vehicle is a car, a bus, a truck, etc., color information of the vehicle, and vehicle number information if the vehicle has a license plate are included in the feature information or object information.

The video summary generator 130 generates a video summary script regarding the original video by using the metadata generated by the metadata generator 140 and also generates at least one video summary based on the generated video summary script. Detailed descriptions regarding this will be provided with reference to FIGS. 2 to 4.

A video summary is technology to convert a long archived video into a short video summary, and is used to track or analyze moving objects so as to form a database of the moving objects and actions thereof and simultaneously display on the display screen multiple objects appearing at different time points in the original video.

According to another exemplary embodiment, when a video summary function is off, the image reproducer 110 receives an original video that is input, stores the received original video in the storage 120, and then transmits the original video to the metadata generator 140. The metadata generator 140 generates metadata with regard to the original video and stores the generated metadata in the storage 120 according to control of the image reproducer 110. The image reproducer 110 may be embodied to store the generated metadata in the storage 120 in real time.

According to another exemplary embodiment, when the video summary function is on, the image reproducer 110 receives a user input with regard to a time section (for example, between 07:00 and 07:30) during which the user wants to watch a video summary. Then, the image reproducer 110 outputs the original video which corresponds to the time section input by the user, generates the video summary by receiving metadata corresponding to the time section input by the user from the metadata generator 140, and displays the generated video summary (S130) together with the original video (S110).

Figure 2:
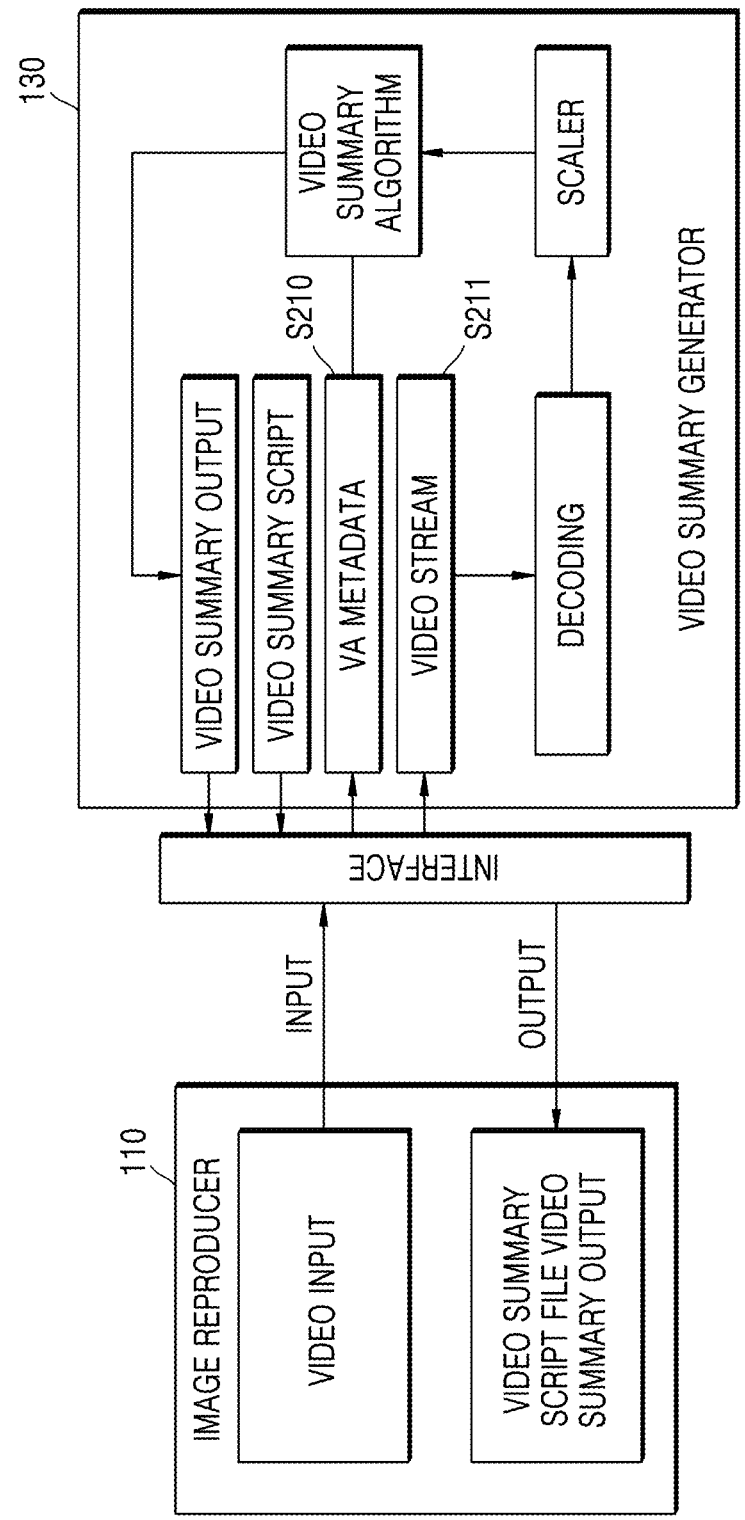
FIG. 2 shows a structure of a video summary unit, according to an exemplary embodiment.

FIG. 2 shows a structure of the video summary generator 130, according to an exemplary embodiment.

The video summary generator 130 decodes a received video (S211) by using metadata (S210) generated by the metadata generator 140 of FIG. 1 so as to generate an original video, re-samples frames of the original video, and then generates video summaries through a process of scaling the original video to be in a range that may be processed by the video summary generator 230.

The video summary generator 230 transmits a video summary script generated with regard to the original video to an image reproducer 210. The image reproducer 210 analyzes the received video summary script and transmits video sections S310, S320 and S330 of FIG. 3, which are necessary for the video summary generator 230, to the video summary generator 230. Video summaries with regard to the video sections S310, S320, and S330 of FIG. 3 are generated in the video summary generator 230.

Figure 3:
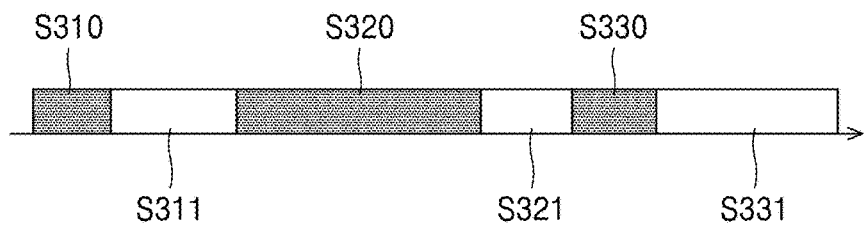
FIG. 3 shows video sections to be used in the video summary unit, according to an exemplary embodiment.

FIG. 3 shows an example of video sections used in the video summary generator 130 of FIG. 1, according to an exemplary embodiment.

The video summary generator 130 generates a compressed image frame by extracting image frames and time information from the received original videos by using the metadata generated by the metadata generator 140 of FIG. 1.

The video summary script is used to extract background information from the image frames by using the metadata generated by the metadata generator 140 of FIG. 1, and detect significant movements by using an advanced motion detection (AMD) method. Then, object information is extracted from the significant movements. The video summary script includes information regarding an order and/or locations of objects to be displayed in a video summary. The objects may be displayed in the video summary in a time order. The video summary script may also include time information with regard to a video section of the original video.

A significant movement denotes a movement of a person, a vehicle, or a certain object from among various movements. Alternatively, the significant movement may denote a movement of a certain object in a certain area. Therefore, a movement such as a movement of leaves in the wind or a movement of clouds is not considered as a significant movement.

According to an exemplary embodiment, the image reproducer 110 of FIG. 1 only transmits significant video sections S310, S320 and S330 of FIG. 3 to the video summary generator 130 of FIG. 1 by using the video summary script. In this case, the significant video sections S310, S320 and S330 of FIG. 3 may be sections including significant movements or at least one of object area information and color area information.

Figure 4:
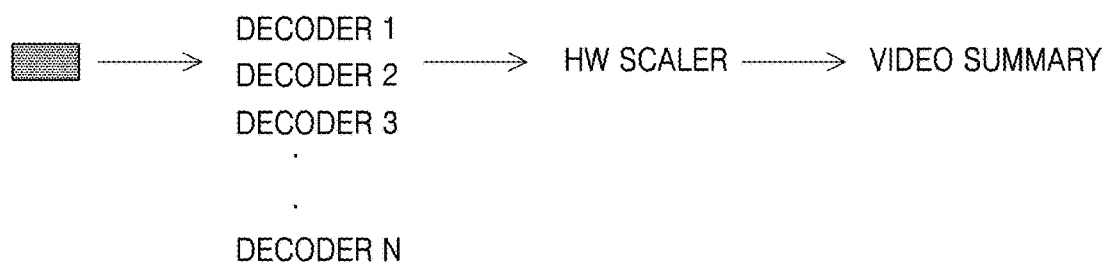
FIG. 4 shows an example of a decoding operation for generating a video summary in the video summary unit, according to an exemplary embodiment.

FIG. 4 shows an example of a decoding operation for generating a video summary in the video summary generator 130 of FIG. 1, according to an exemplary embodiment.

The image reproducer 110 of FIG. 1 only transmits the significant video sections S310, S320 and S330 of FIG. 3 to the video summary generator 130 by using the video summary script. In this case, each of the significant video sections S310, S320 and S330 of FIG. 3 may be decoded in different decoders.

The video summary generator 130 of FIG. 1 generates a video summary in frame units by extracting information about at least one of a movement area, an object area, a color and a predetermined event from each of the significant video sections S310, S320 and S330 of FIG. 3 which are decoded in a multi-decoder, and then transmits the generated video summary to the image reproducer 110 of FIG. 1. The image reproducer 110 controls the video summary, which is generated in frame units, to be stored in the storage 120 of FIG. 1 or is simultaneously reproduced together with an original video of the video summary.

Figure 5:
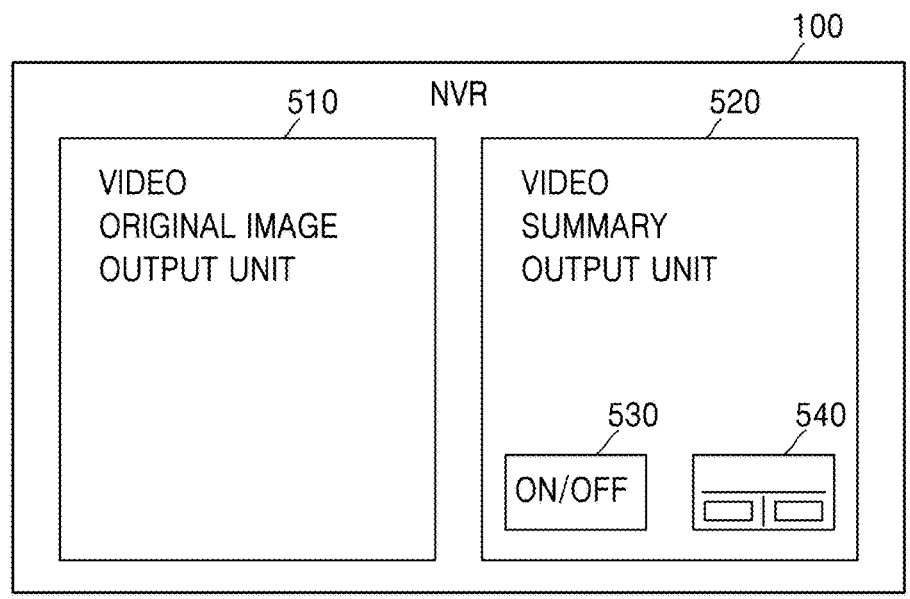
FIG. 5 shows reproduction of a video summary in an imaging apparatus, according to an exemplary embodiment.

FIG. 5 shows an example of reproducing a video summary in an imaging apparatus, according to an exemplary embodiment.

The imaging apparatus 100 includes a video original image output unit 510 and a video summary output unit 520. A display of the imaging apparatus 100 is divided and may output both original videos and video summaries thereof.

The imaging apparatus 100 includes a first interface 530 and a second interface 540.

The first interface 530 allows a user select whether to turn on or off a video summary function. When the first interface 530 is in an on state, the second interface 540 allows the user designate a video summary of a certain time section. The user may select multiple time sections by using the second interface 540.

When the video summary function is turned on in the first interface 530, the second interface 540 allows the user to automatically select a certain time section.

FIG. 6 shows an example of reproducing video summaries in an imaging apparatus, according to an exemplary embodiment.

The imaging apparatus 100 may reproduce multiple videos from multiple channels. In this case, the imaging apparatus displays a channel selected by the user on a display screen by dividing the display screen, and when the user turns on the video summary function, displays a video summary of each channel. When the channels are displayed, a determination as to whether the video summary with regard to each channel is displayed may be made.

FIG. 7 shows an example in which video summary functions with regard to channels are selectively turned on/off when the channels are displayed in an imaging apparatus, according to an exemplary embodiment.

As shown in FIG. 6, while the user watches original videos and video summaries of first and seventh channels, the user may turn off the video summary function of channel 7. Then, the imaging apparatus may additionally display original videos of an eighth channel.

Also, the imaging apparatus 100 may display original videos of the first, seventh and eighth channels 710, 720 and 730, and by turning on the video summary function of the first channel 710 from among the first, seventh and eighth channels 710, 720 and 730, the video summary of the first channel 710 may be displayed (711).

FIG. 8 shows an example of simultaneously reproducing video summaries with regard to a single channel of an imaging apparatus, according to an embodiment.

The user selects a certain channel and may watch original videos, and video summaries of certain time sections of the selected channel. For example, the user may watch video summaries at office hours 820, lunch time 830, and office leaving period 830 in a first channel 810 by receiving input videos from a network surveillance camera that monitors entrances and exits of an office.

FIG. 9 shows an example of reproducing a desired number of video summaries with regard to channels of an imaging apparatus, according to an exemplary embodiment.

The imaging apparatus 100 may reproduce original videos of first and seventh channels 910 and 930. The user may turn on video summary functions of the first and seventh channels 910 and 930 by using a first interface and then may reproduce video summaries of the first and seventh channels 910 and 930.

In this case, the user reproduces a video summary 920 of a time section 921 in a range from eight o'clock to nine o'clock with regard to the first channel 910 and may reproduce two video summaries 940 and 942 with regard to the seventh channel 930. Also, the user may intuitively select desired time sections by using a second interface 921.

Figure 10:
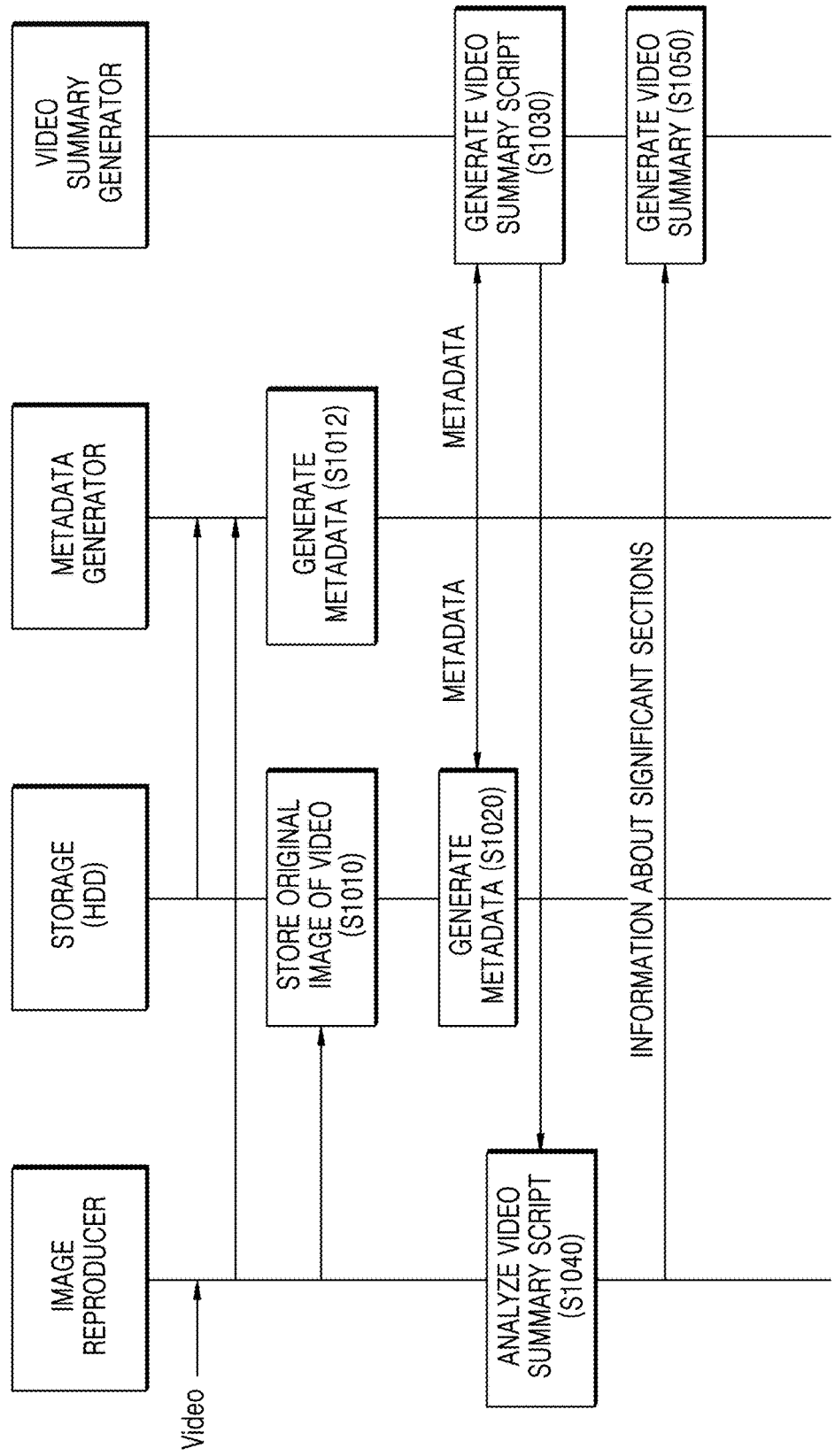
FIG. 10 is a flowchart of a method of providing a video summary in an imaging apparatus, according to an exemplary embodiment.

FIG. 10 is a flowchart of a method of providing a video summary in an imaging apparatus, according to an exemplary embodiment.

The imaging apparatus stores an original video in a storage when a video input is received in operation S1010. A metadata generator generates metadata by using the video input received in the metadata generator or generates metadata with regard to the original videos which are stored in the storage in operation S1020.

When the metadata is generated by the metadata generator, an image reproducer controls the generated metadata to be stored in the storage in operation S1020. Also, a video summary script with regard to the original video is generated in a video summary generator by using the generated metadata in operation S1030. The video summary script generated by the video summary generator is analyzed in the image reproducer in operation S1040, and information about significant video sections is transmitted to the video summary generator, as shown in FIG. 3. Video summaries are generated in the video summary generator by using the information about the significant video sections, the information being identified based on the video summary script in operation S1050.

As described above, according to the above exemplary embodiments, an imaging apparatus for providing video summaries extracts a certain event detected via various intelligent image surveillance systems or quickly provides a desired result when a certain object needs to be extracted from a video, wherein the intelligent surveillance systems may be used to detect moving objects in and around major national facilities such as airports, military units, ports, bridges, buildings, stadiums, parking lots, and casinos, or in transportation areas such as bus and subway stops, on vehicles, in the vicinity of mobile devices, etc.

In addition, other embodiments can also be implemented through computer readable code/instructions stored in/on a medium, e.g., a computer readable medium, in order to control at least one processing element to implement any of the above described embodiments. The medium can correspond to any medium permitting the storage and/or transmission of the computer readable code.

The computer readable code can be recorded/transferred on a medium in a variety of ways, examples of the medium including a recording medium, such as a magnetic storage medium (e.g., ROM, floppy disk, hard disk, etc.) and an optical recording medium (e.g., CD- or DVD), and a transmission medium such as an Internet transmission medium. Thus, according to exemplary embodiments, the medium may also be measurable structure including or carrying signals or information, such as a device carrying bitstreams. The medium may also be a distributed network so that the computer readable code may be stored/transferred and executed in a distributed fashion. Furthermore, the processing element could include a processor or a computer processor, and processing elements may be distributed and/or included in a single device. Specifically, at least one of the components, elements or units represented by a block as illustrated in FIGS. 1 and 2 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described above should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. An imaging apparatus for providing a video summary, the apparatus comprising:
   a storage configured to store at least one original video;

a metadata generator configured to generate metadata with regard to the original video;

a video summary generator configured to generate at least one video summary script with regard to the original video by using the generated metadata, and generate a video summary based on the generated video summary script;

an image reproducer configured to control the storage, the metadata generator, and the video summary generator, store the metadata generated by the metadata generator, and reproduce at least one of the original video and the video summary;

a first interface provided for controlling turning on or off of a function of reproducing the video summary; and a second interface provided for designating the video summary of a certain time section in the original video, wherein the second interface is configured to select the certain time section when the video summary function is turned on via the first interface.

2. The imaging apparatus of claim 1, wherein the metadata generator is further configured to assigns at least one identifier to at least one object, respectively, included in the original video, and provide the video summary by extracting at least one of coordinate information of the object to which the identifier is assigned, object classification information for classifying the object according to type thereof, color classification information for classifying the object according to color thereof, and movement detection information of the object.

3. The imaging apparatus of claim 1, wherein the video summary script is used to extract at least one video section corresponding to the video summary from among the original video.

4. The imaging apparatus of claim 3, wherein the video summary script comprises time information with regard to each of the at least one video section, wherein the at least one video section is classified based on the time information, and wherein the at least one classified video section is decoded by using at least one decoder.

5. The imaging apparatus of claim 4, wherein the video summary generator is configured to generate the video summary by combining the at least one video section.

6. The imaging apparatus of claim 4, wherein the video summary generator is configured to generate the video summary based on information about at least one of an area of a predetermined movement detected in the at least one video section that is classified based on the time information, an object area, and a color and a predetermined event.

7. The imaging apparatus of claim 1, wherein the at least one video section comprises a video including a predetermined movement in the original video.

8. The imaging apparatus of claim 1, wherein the image reproducer is configured to reproduce both the original video and the video summary.

9. The imaging apparatus of claim 8, wherein, when the original video and the video summary are reproduced simultaneously at different areas on a display screen.

10. The imaging apparatus of claim 1, wherein the image reproducer is configured to reproduce the original video together with a plurality of video summaries with regard to the original video.

11. The imaging apparatus of claim 10, wherein, when the original video and the plurality of video summaries are reproduced simultaneously at different areas on a display screen.

12. The imaging apparatus of claim 1, wherein the image reproducer is configured to reproduce a plurality of original videos and video summaries with regard to the original videos together.

13. The imaging apparatus of claim 1, wherein when the certain time section is set in the video summary generator through the second interface, the image reproducer is configured to receive the metadata generated during the certain time section and stored in the storage, and wherein the video summary generator is configured to generate the video summary script based on the received metadata.

14. The imaging apparatus of claim 1, wherein the video summary displays simultaneously a plurality of objects appearing at different time points in the original video, on a display screen.

15. The imaging apparatus of claim 14, wherein the video summary script is used to extract at least one video section corresponding to the video summary from among the original video, and wherein the at least one video section comprises a video indicating a predetermined movement in the original video.

16. A method of providing a video summary by using an imaging apparatus comprising a storage, a metadata generator, a video summary generator and an image reproducer, the method comprising:

storing at least one original video in the storage;

generating, in the metadata generator, metadata with regard to the original video;

generating, in the video summary generator, at least one video summary script with regard to the original video by using the generated metadata, and generating a video summary based on the generated video summary script; and reproducing at least one of the original video and the video summary in the image reproducer, wherein the method further comprises:

controlling a first interface in the imaging apparatus to turn on or off of a function of reproducing the video summary; and controlling a second interface in the imaging apparatus to designate the video summary of a certain time section in the original video; and select the certain time section when a function of reproducing the video summary is turned on via the first interface.

17. The method of claim 16, wherein the video summary script is used to extract at least one video section corresponding to the video summary from among the original video, and wherein the at least one video section comprises a video indicating a predetermined movement in the original video.

18. A non-transitory computer readable recording medium storing a method of providing a video summary by using an imaging apparatus comprising a storage, a metadata generator, a video summary generator and an image reproducer, the method comprising:

storing at least one original video in the storage;

generating, in the metadata generator, metadata with regard to the original video;

generating, in the video summary generator, at least one video summary script with regard to the original video by using the generated metadata, and generating a video summary based on the generated video summary script; and reproducing at least one of the original video and the video summary in the image reproducer,
wherein the method further comprises:
controlling a first interface in the imaging apparatus to turn on or off of a function of reproducing the video summary; and
controlling a second interface in the imaging apparatus to designate the video summary of a certain time section in the original video; and select the certain time section when a function of reproducing the video summary is turned on via the first interface.

* * * * *